US010382193B2

(12) United States Patent
Saab et al.

(10) Patent No.: US 10,382,193 B2
(45) Date of Patent: Aug. 13, 2019

(54) PERFORMING CRYPTOGRAPHIC DATA PROCESSING OPERATIONS IN A MANNER RESISTANT TO EXTERNAL MONITORING ATTACKS

(71) Applicant: Cryptography Research, Inc., Sunnyvale, CA (US)

(72) Inventors: Sami James Saab, San Francisco, CA (US); Pankaj Rohatgi, Los Altos, CA (US); Craig E. Hampel, Los Altos, CA (US)

(73) Assignee: Cryptography Research, Inc., Sunnyvale, CA (US)

( * ) Notice: Subject to any disclaimer, the term of this patent is extended or adjusted under 35 U.S.C. 154(b) by 187 days.

(21) Appl. No.: 15/311,741

(22) PCT Filed: May 15, 2015

(86) PCT No.: PCT/US2015/031203
§ 371 (c)(1),
(2) Date: Nov. 16, 2016

(87) PCT Pub. No.: WO2015/191239
PCT Pub. Date: Dec. 17, 2015

(65) Prior Publication Data
US 2017/0085368 A1 Mar. 23, 2017

Related U.S. Application Data

(60) Provisional application No. 62/011,245, filed on Jun. 12, 2014.

(51) Int. Cl.
*G06F 9/30* (2018.01)
*H04L 9/00* (2006.01)
(Continued)

(52) U.S. Cl.
CPC .......... *H04L 9/002* (2013.01); *G06F 9/30007* (2013.01); *G06F 21/556* (2013.01);
(Continued)

(58) Field of Classification Search
CPC ....... H04L 9/002; H04L 9/003; H04L 9/0822; H04L 9/0631; H04L 2209/12; G06F 21/556
See application file for complete search history.

(56) References Cited

U.S. PATENT DOCUMENTS 4,558,176 A * 12/1985 Arnold .................... G06F 21/10 380/29
5,991,708 A * 11/1999 Levine ................ G06F 11/3409 702/186
(Continued)

FOREIGN PATENT DOCUMENTS

DE 102011088502 B3 5/2016
EP 1115094 A2 7/2001
(Continued)

OTHER PUBLICATIONS

PCT International Search Report for PCT Application No. PCT/US2015/031203, dated Aug. 21, 2015, 10 pages.
(Continued)

*Primary Examiner* — Techane Gergiso
(74) *Attorney, Agent, or Firm* — Lowenstein Sandler LLP

(57) ABSTRACT

Systems and methods for performing cryptographic data processing operations in a manner resistant to external monitoring attacks. An example method may comprise: executing, by a processing device, a first data manipulation instruction, the first data manipulation instruction affecting an internal state of the processing device; executing a second data manipulation instruction, the second data manipulation instruction interacting with said internal state; and breaking
(Continued)

a detectable interaction of the first data manipulation instruction and the second data manipulation instruction by executing a third data manipulation instruction utilizing an unpredictable data item.

17 Claims, 11 Drawing Sheets

(51) Int. Cl.
*H04L 9/06* (2006.01)
*H04L 9/08* (2006.01)
*G06F 21/55* (2013.01)

(52) U.S. Cl.
CPC ............ *H04L 9/003* (2013.01); *H04L 9/0822* (2013.01); *H04L 9/0631* (2013.01); *H04L 2209/12* (2013.01)

(56) References Cited

U.S. PATENT DOCUMENTS

| | | | | |
|---|---|---|---|---|
| 7,124,170 | B1* | 10/2006 | Sibert | G06F 12/145 709/216 |
| 7,168,065 | B1* | 1/2007 | Naccache | G06F 11/28 712/229 |
| 7,191,433 | B2* | 3/2007 | Narad | H04L 45/16 717/140 |
| 9,425,959 | B1* | 8/2016 | Pedersen | G09C 1/00 |
| 2001/0018736 | A1* | 8/2001 | Hashimoto | G06F 21/10 713/1 |
| 2004/0252831 | A1* | 12/2004 | Uehara | H04L 9/0631 380/44 |
| 2004/0252842 | A1* | 12/2004 | Henry | G06F 9/30003 380/277 |
| 2006/0075312 | A1* | 4/2006 | Fischer | G06F 21/74 714/48 |
| 2006/0236405 | A1* | 10/2006 | Terauchi | H04L 63/06 726/27 |
| 2007/0180541 | A1* | 8/2007 | Shu | G06F 9/3001 726/34 |
| 2007/0204137 | A1* | 8/2007 | Tran | G06F 9/30181 712/214 |
| 2007/0230694 | A1* | 10/2007 | Rose | G06F 7/58 380/46 |
| 2008/0052499 | A1* | 2/2008 | Koc | G06F 9/3806 712/238 |
| 2009/0100524 | A1* | 4/2009 | Honda | G06F 9/468 726/26 |
| 2009/0327572 | A1* | 12/2009 | Cho | G06F 13/4291 711/5 |
| 2011/0286596 | A1* | 11/2011 | Gressel | H04L 9/0637 380/268 |
| 2012/0159194 | A1* | 6/2012 | Anderson | H04L 9/002 713/190 |
| 2012/0246641 | A1* | 9/2012 | Gehrmann | G06F 9/445 718/1 |
| 2012/0250854 | A1* | 10/2012 | Danger | H04L 9/003 380/28 |
| 2012/0307997 | A1* | 12/2012 | Endo | H04L 9/003 380/28 |
| 2013/0322462 | A1* | 12/2013 | Poulsen | H04J 3/06 370/458 |
| 2013/0332744 | A1* | 12/2013 | Zhuang | G06F 21/72 713/189 |
| 2014/0143883 | A1* | 5/2014 | Shen-Orr | H04L 9/003 726/26 |
| 2015/0304102 | A1* | 10/2015 | Nakano | H04L 9/003 713/189 |

FOREIGN PATENT DOCUMENTS

| | | |
|---|---|---|
| EP | 1772811 A2 | 4/2007 |
| EP | 1873671 A1 | 1/2008 |

OTHER PUBLICATIONS

Bayrak, Ali Galip et al., "A First Step Towards Automatic Application of Power Analysis Countermeasures", DAC 2011, Jun. 5-10, 2011, pp. 230-235. 6 pages.
CN Office Action dated Dec. 5, 2018 re: CN Appln. No. 201580024635. 8. 13 Pages. (With Translation).
Notification Concerning Transmittal of International Preliminary Report on Patentability dated Dec. 22, 2016 re: Int'l Appln. No. PCT/US15/031203. 8 Pages.
Tillich, Stefan et al., "Power Analysis Resistant AES Implementation with Instruction Set Extensions", CHES 2007, vol. 4727, pp. 303-319, Sep. 10-13, 2007. 17 pages.
Tillich, Stefan et al., "Protecting AES Software Implementations on 32-bit Processors against Power Analysis", ACNS 2007, vol. 4521, pp. 141-157, Jun. 5-8, 2007. 17 pages.
TW Office Action dated Dec. 26, 2018 re: TW Appln. No. 104112261. 16 Pages. (With Translation).

* cited by examiner

200

| | |
|---|---|
| • **AESDEC** | Performs one round of AES decryption |
| • **AESDECLAST** | Performs last round of AES decryption |
| • **AESENC** | Performs one round of AES encryption |
| • **AESENCLAST** | Performs last round of AES encryption |
| • **AESIMC** | Performs inverse mix columns |
| • **AESKEYGENASSIST** | Used to calculated round keys |
| • **PCLMULQDQ** | Carry-less multiply of two 64-bit values |

FIG. 2

PERFORMING CRYPTOGRAPHIC DATA PROCESSING OPERATIONS IN A MANNER RESISTANT TO EXTERNAL MONITORING ATTACKS

RELATED APPLICATIONS

This application is the U.S. national stage under 35 U.S.C. § 371 of International Application Number PCT/US2015/031203, filed May 15, 2015, which claims the benefit of U.S. Provisional Application No. 62/011,245, filed Jun. 12, 2014. The entire contents of the above-referenced applications are incorporated by reference herein.

TECHNICAL FIELD

The present disclosure is generally related to computer systems, and is more specifically related to cryptographic data processing systems and methods.

BACKGROUND

Systems and methods for safeguarding cryptographic keys and/or other sensitive data are constantly evolving, as are systems and methods for gaining unauthorized access to the protected data. These systems and methods range from brute force password cracking to complex external monitoring attacks.

BRIEF DESCRIPTION OF THE DRAWINGS

The present disclosure is illustrated by way of examples, and not by way of limitation, and may be more fully understood with references to the following detailed description when considered in connection with the figures, in which:

FIG. 2 schematically illustrates AES-NI enhanced instruction set supported by certain Intel® microprocessors;

DETAILED DESCRIPTION

Figure 1:
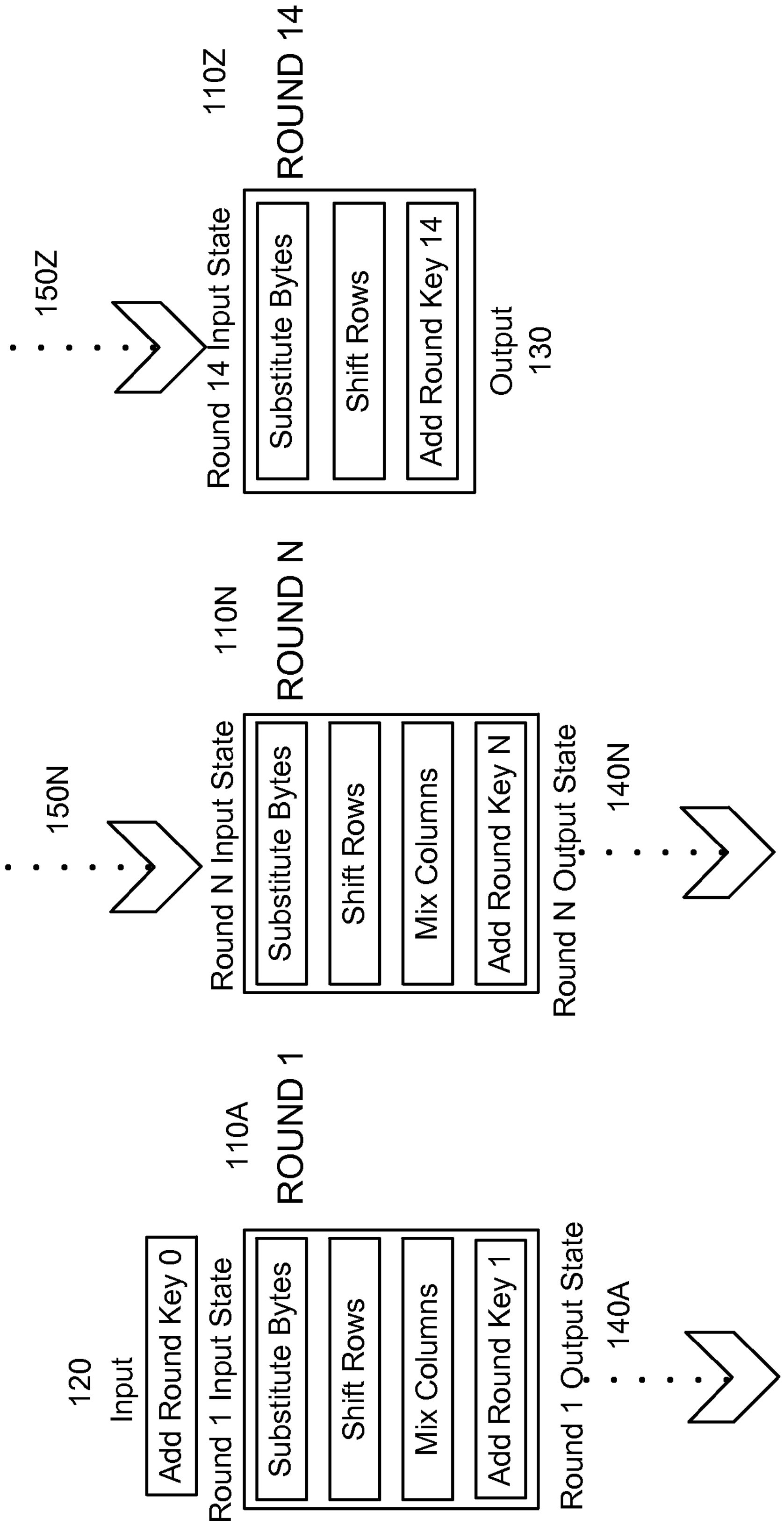
FIG. 1 schematically illustrates a data flow diagram of an example AES implementation by a general purpose of a specialized data processing device.

Described herein are methods for performing cryptographic data processing operations in a manner resistant to external monitoring attacks.

"Cryptographic data processing operation" herein shall refer to a data processing operation involving secret parameters (e.g., encryption/decryption operations using secret keys). "Cryptographic data processing system" herein shall refer to a data processing system (e.g., a general purpose or specialized processor, a system-on-chip, or the like) configured or employed for performing cryptographic data processing operations.

"External monitoring attack" herein refers to a method of gaining unauthorized access to protected information by deriving one or more protected information items from certain aspects of the physical implementation of the target cryptographic data processing system. Side channel attacks are external monitoring attacks that are based on measuring values of one or more physical parameters associated with a target cryptographic data processing system, such as the elapsed time of certain data processing operations, the power consumption by certain circuits, the current flowing through certain circuits, heat or electromagnetic radiation emitted by certain circuits of the target cryptographic data processing system, etc.

Various side channel attacks may be designed to obtain unauthorized access to certain protected information (e.g., encryption keys that are utilized to transform the input plain text into a cipher text) being stored within and/or processed by a target cryptographic system. In an illustrative example, an attacker may exploit interactions of sequential data manipulation operations which are based on certain internal states of the target data processing system. The attacker may apply differential power analysis (DPA) methods to measure the power consumption by certain circuits of a target cryptographic data processing system responsive to varying one or more data inputs of sequential data manipulation operations, and thus determine one or more protected data items (e.g., encryption keys) which act as operands of the data manipulation operations.

The present disclosure provides methods of performing cryptographic data processing operations in a manner resistant to external monitoring attacks (e.g., side channel attacks). The methods involve breaking certain interactions of sequential data manipulation operations, as described in more details herein below. The systems and methods described herein may be implemented by hardware (e.g., general purpose and/or specialized processing devices, and/or other devices and associated circuitry), software (e.g., instructions executable by a processing device), or a combination thereof. Various aspects of the methods and systems are described herein by way of examples, rather than by way of limitation.

In various illustrative examples described herein below, cryptographic data processing systems may be configured or employed for implementing encryption and/or decryption methods based on the Advanced Encryption Standard (AES). However, the systems and methods described herein for performing cryptographic data processing operations in a manner resistant to external monitoring attacks may be applicable to various other cryptographic data processing systems and methods.

FIG. 1 schematically illustrates a data flow diagram of an example AES implementation by a general purpose of a specialized data processing device. AES algorithm performs several iterations (also referred to as "rounds") 110A-110Z to transform, using an encryption key of a fixed size (128, 192, or 256 bits) and a plain text 120 of a fixed size (e.g., 128 bits) into an encrypted cipher text 130. Each round comprises a sequence of certain arithmetic, logical, or reordering operations performed on an input state using a round key which is a subkey derived from the encryption key. The resulting state 140 of each but the last round is then utilized as the input state 150 of the subsequent round.

An example AES implementation may start by initializing the state with a 128-bit plain text. The data processing device may then perform the initial AES round by adding, using the exclusive OR (XOR) operation, the first round key to the state in order to determine the round 1 input state which can subsequently be operated upon by the first AES round 110A.

In an encryption operation, each of subsequent AES rounds 110N comprises four main operations to update the state: Substitute Bytes (independently operates on each of the 16 bytes of the state), shift rows (reorders the 16 bytes of the state), Mix Columns (independently operates on each of four 32-bit words of the state), and Add Round Key (adds, using XOR operation, the round key to the state). The last AES round 110Z comprises three of the above described operations, by omitting the Mix Columns operation. In a decryption operation (not shown in FIG. 1), each AES round comprises inverse operations corresponding to the above described operations, which are performed in the reverse order.

Various AES implementations may differ by the cipher key size: 128 bits, 192 bits, or 256 bits. The number of AES rounds may be defined by the key size: for the key size of 128 bits, ten AES rounds may be performed; for the key size of 192 bits, twelve AES rounds may be performed; and for the key size of 256 bits, fourteen AES rounds may be performed.

In certain implementations, data processing devices may support an enhanced instruction set for AES cryptographic operations. Instructions of such an enhanced instruction set may be based on hardware and/or microcode implementation of some of the computationally intensive operations of the AES algorithm, thus significantly improving overall performance as compared to purely software AES implementations.

FIG. 2 schematically illustrates AES-NI enhanced instruction set 200 supported by certain Intel® microprocessors.

AESDEC instruction performs a single round of decryption, by performing the four inverse operations: Inverse Shift Rows, Inverse Substitute Bytes, Inverse Mix Columns, and Add Round Key.

AESDECLAST instruction performs the last round of decryption, by performing Inverse Shift Rows, Inverse Substitute Bytes, and Add Round Key operations.

AESENC instruction performs a single round of encryption, by performing the four basic operations of the AES algorithm: Shift Rows, Substitute Bytes, Mix Columns, and Add Round Key.

AESENCLAST instruction performs the last round of encryption, by performing Shift Rows, Substitute Bytes, and Add Round Key operations.

AESIMC instruction converts the encryption round keys to a form usable for decryption.

AESKEYGENASSIST instruction generates the round keys used for encryption.

PCLMULQDQ instruction performs carry-less multiplication of two values.

While FIG. 2, the corresponding description sections, and various illustrative examples throughout this disclosure may be based on specific examples of processor architectures and instruction sets, including AES-NI enhanced instruction set, the systems and methods described herein may be operable with various other processing devices based on various processor architectures and instruction sets, including, e.g., certain ARM® microprocessors and certain SPARC® microprocessors. In an illustrative example, an enhanced instruction set supported by certain ARM® microprocessors comprises the following instructions: AESE and AESD instructions for performing a single round of AES encryption or description, respectively; AESMC and AESIMC instructions for performing AES MixColumns and Inverse MixColumns operations, respectively. In another illustrative example, an enhanced instruction set supported by certain SPARC® microprocessors comprises the following instructions: AES_EROUND01, AES_EROUND23, AES_EROUND01_L, AES_EROUND_23_L, AES_DROUND01, AES_DROUND23, AES_DROUND01_L, and AES_DROUND_23_L for performing AES encryption or decryption rounds.

Implementing an enhanced instruction set for performing cryptographic data processing operations (e.g., AES-NI enhanced instruction set schematically illustrated by FIG. 2) may significantly improve the processing system performance with respect to cryptographic data processing operations, and may further improve security with respect to certain types of external monitoring attacks, e.g., timing-based side channel attacks, as each instruction of the enhanced instruction set is performed within a pre-determined number of processing cycles which is not dependent on the input or intermediate states. However, certain processing systems, including processing systems implementing an enhanced cryptographic instruction set, may be vulnerable to the differential power analysis (DPA) based side channel attacks.

In various illustrative examples, the current flowing through certain components of a target data processing system may vary in response to varying inputs of certain instructions being executed by the data processing system. In a simplistic example, executing an instruction that requires a bit transition from 0 to 1 or vice versa in an internal state of a data processing system may require more power than executing the same instruction on different operands and/or internal states such that the current value of the internal state does not need to be modified (i.e., no bit transition is required). In various implementations, an internal state of a data processing system may comprise one or more internal registers or other form of architecturally invisible memory, and may further comprise other factors contributing to current flows within the processing device, e.g., charges on internal buses and wiring or states of individual transistors.

The target data processing system may employ various internal states for storing some intermediate results in executing certain instructions. Hence, the attacker may employ DPA methods to observe the system response (e.g., the power consumption by certain components or circuits) to known varying inputs to certain instructions to derive protected operands of such instructions.

DPA herein refers to external monitoring methods involving measuring the data dependent power consumption by a target data processing system. A DPA test may comprise measuring the power consumption by certain circuits of the target data processing system responsive to varying data inputs, in order to exploit interactions of sequential data manipulation operations which are based on certain internal states of the target data processing system.

Figure 3:
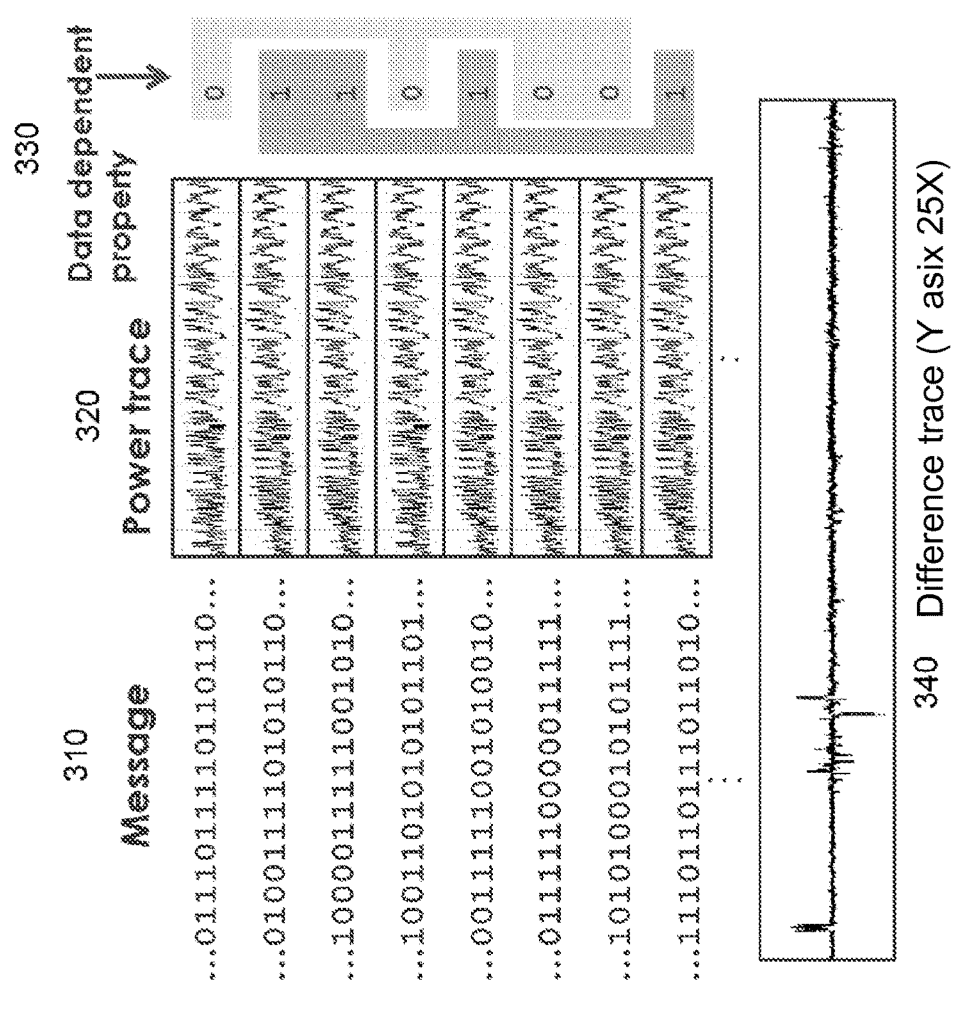
FIG. 3 schematically illustrates an example Differential Power Analysis (DPA) test.

FIG. 3 schematically illustrates an example DPA process. Referring to FIG. 3, an example DPA process may comprise performing multiple data processing operations on different input data 310 while recording a power trace 320 by measuring the power consumption by certain circuits of the target data processing system. The resulting set of power traces may be partitioned into several subsets based on a data dependent property 330 (e.g., a data bit of an initial, final or intermediate internal state). The difference of the means of the subsets may be calculated to produce a difference trace 340 that comprises spikes at the time offsets corresponding to the operations in which the data dependent property affects the measured power consumption.

Figure 4:
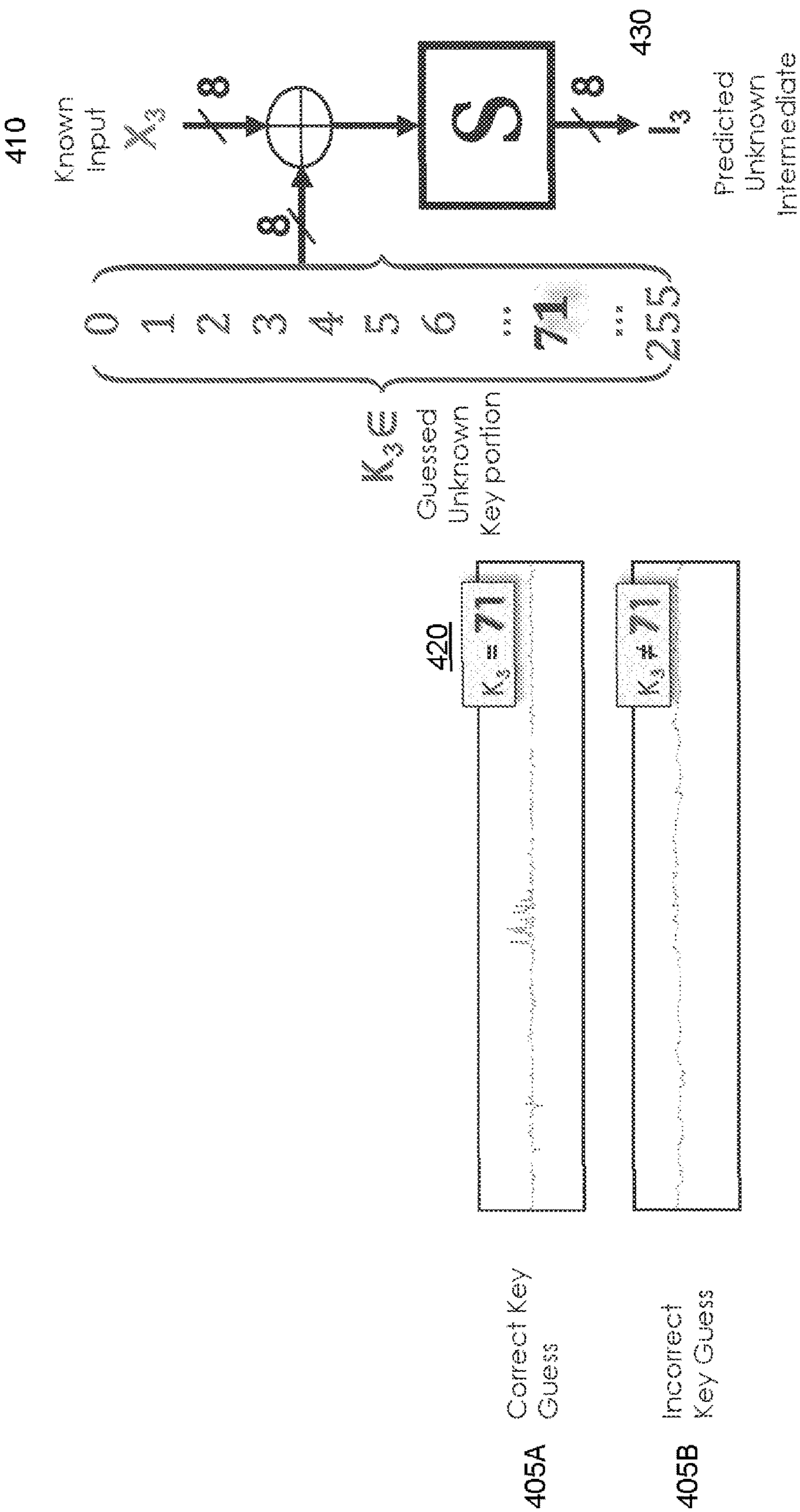
FIG. 4 schematically illustrates an example DPA test-based attack against a target cryptographic data processing system.

FIG. 4 schematically illustrates an example DPA process-based attack against a target cryptographic data processing system. Referring to FIG. 4, an attacker may record power traces of multiple cryptographic data processing operations using the same encryption key and varying the plain text input 410. The attacker may then guess a portion of the encryption key (e.g., $K_3$ key portion 420), predict the corresponding intermediate state (e.g., $I_3$ state 430) and perform a difference of means statistical test to ascertain whether the measured power values are influenced by the predicted intermediate states. The above described operations may be repeated for the remaining portions of the encryption key, until the whole key is successfully predicted. For the correct sub key, the difference of means statistical test will show spikes (405 A), whereas for any incorrect sub key guess, the difference of means statistical test will not show a spike (405B).

The above described and other DPA tests may be utilized to detect vulnerabilities, or "data leaks," in various processing systems performing various sequences of cryptographic data processing operations.

Described herein below are example vulnerabilities and the corresponding methods for performing cryptographic data processing operations in a manner resistant to external monitoring attacks exploiting these and other vulnerabilities, in accordance with one or more aspects of the present disclosure. In addition to the specific example vulnerabilities described below, the systems and methods described herein may be employed for performing cryptographic data processing operations in a manner resistant to various other external monitoring attacks exploiting various vulnerabilities of target data processing systems.

Figure 5:
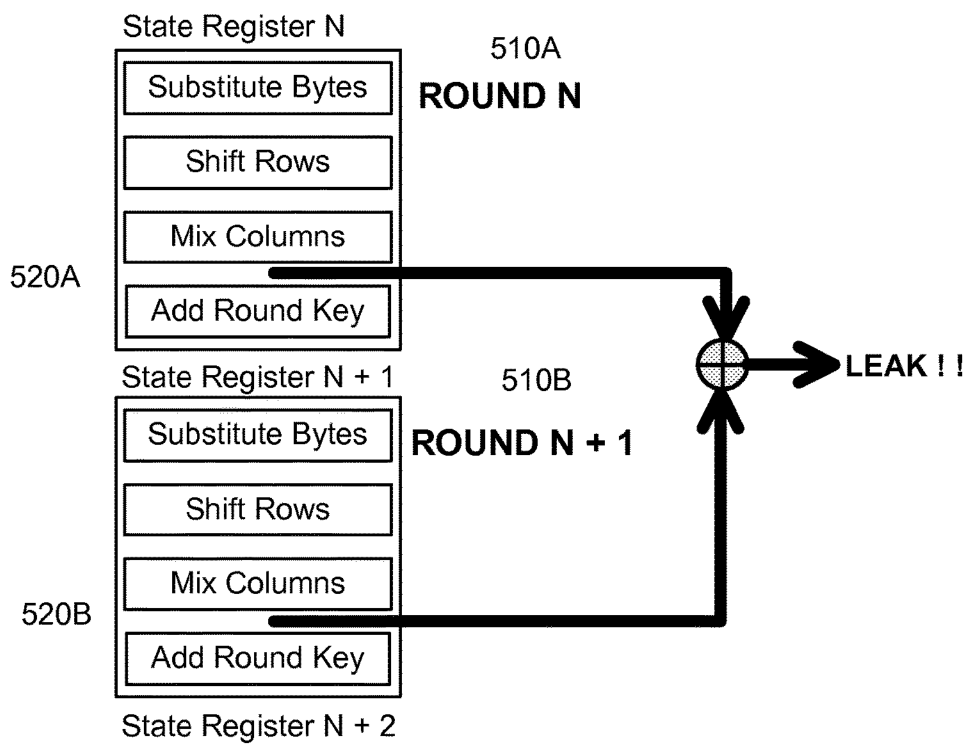
FIG. 5 schematically illustrates a data leak involving sequential cryptographic data manipulation instructions of an enhanced cryptographic instruction set.

In certain implementations, a data processing system may exhibit a data leak involving sequential cryptographic data manipulation instructions of an enhanced cryptographic instruction set, as schematically illustrated by FIG. 5. In an illustrative example, a data processing system may execute two successive AESENC instructions for performing AES encryption rounds 510A-510B. Each instruction may utilize certain inputs (e.g., the round state and the round key). Executing each instruction 510A and 510B may result in the corresponding internal states 520A and 520B (which may be stored in an internal register of the data processing system). The data processing system may exhibit a DPA-detectable data leakage involving the states 520A and 520B: the observed power consumed by certain circuits of the data processing system when executing the data manipulation instructions 510A-510B resulting in overwriting a state bit may exceed the observed power consumed by the data processing system when executing the same data manipulation instructions resulting in preserving the existing value of the state bit.

In accordance with one or more aspects of the present disclosure, cryptographic data processing operations may be performed in a manner resistant to external monitoring attacks exploiting the above described vulnerability of the data processing system, by breaking the interaction of the sequential cryptographic data processing instructions which are likely to exhibit the above described data leakage. In certain implementations, the data processing system may break the interaction of the sequential cryptographic data processing instructions by executing another data manipulation instruction, serially or concurrently with respect to the sequential data manipulation instructions, as schematically illustrated by FIG. 6.

Figure 6:
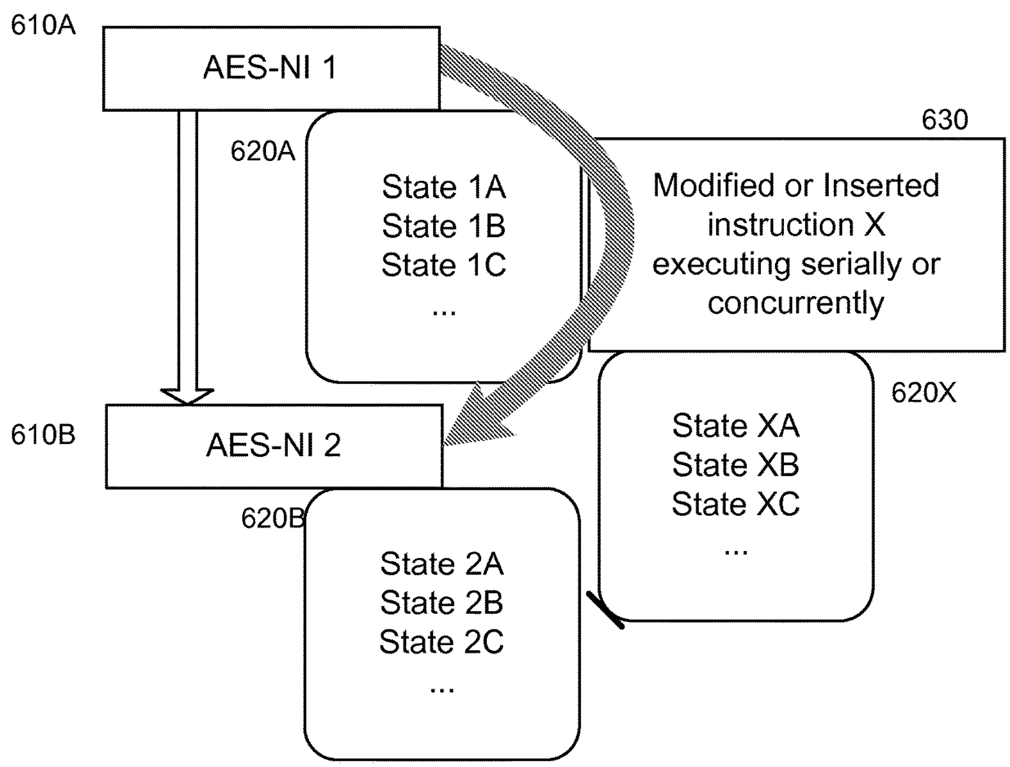
FIG. 6 schematically illustrates breaking the interaction of sequential cryptographic data manipulation instructions by executing a data manipulation instruction by the data processing system, in accordance with one or more aspects of the present disclosure.

Referring to FIG. 6, the original execution flow 610 can comprise two cryptographic data manipulation instructions of an enhanced cryptographic instruction set (e.g., AES-NI instructions) 610A and 610B. Each of the instructions 610A and 610B may require certain inputs (e.g., the round state and the round key). Executing the instructions 610A and 610B may result in the corresponding internal states 620A-620B. As noted herein above, the data processing system may exhibit a DPA-detectable data leakage involving the states 620A-620B: the observed power consumed by certain circuits of the data processing system when executing the data manipulation instructions 610A and 610B resulting in overwriting a state bit may exceed the observed power consumed by the data processing system when executing the same data manipulation instructions resulting in preserving the existing value of the state bit.

In order to perform the cryptographic data processing instructions in a manner resistant to external monitoring attacks, the data processing system may break the interaction of the sequential cryptographic data processing instructions 610A-610B by executing a data manipulation instruction 630, serially or concurrently with respect to the sequential data manipulation instructions 610A-610B. In various illustrative examples, the data manipulation instruction 630 may utilize one or more input data items, and may result in an internal state 620X. In order to break the interaction of the sequential cryptographic data processing instructions 610 and 620, the data manipulation instruction 630 may be executed with the inputs represented by unpredictable (e.g., random) data, so that the resulting internal state 620X would be unpredictable by a potential attacker. Thus, the potential attacker may be effectively prevented from exploiting any data leakage associated with the internal state transitions: as external monitoring attacks exploiting vulnerabilities associated with internal system states involve measuring the system response to the varying input data, such an attack could not be implemented when the input data is unpredictable.

Thus, executing the data manipulation instruction 630, serially or concurrently with respect to the sequential data manipulation instructions 610A and 610B, may effectively break the undesirable interaction of the sequential cryptographic data processing instructions 610A and 610B and hence perform the instructions in a manner resistant to external monitoring attacks.

Figure 7:
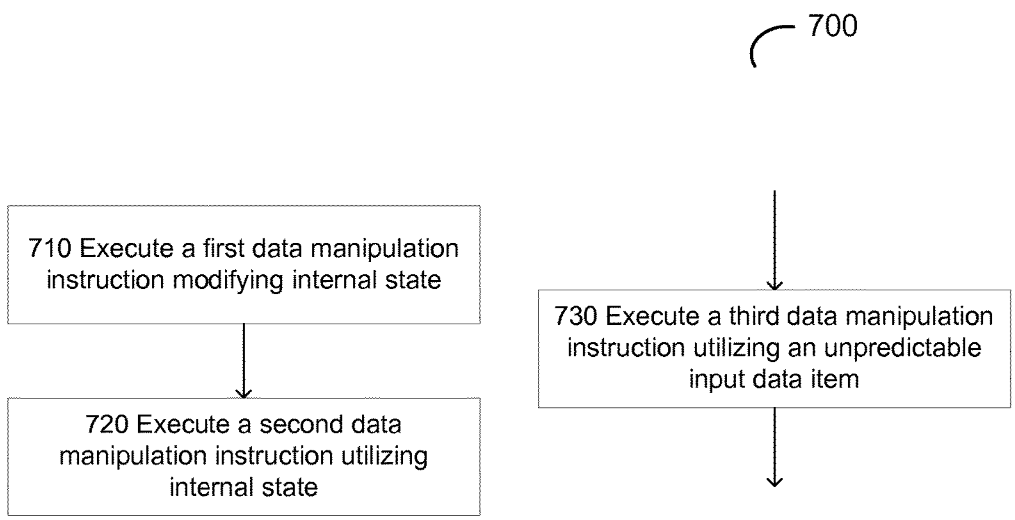
FIG. 7 depicts a flow diagram of an example method for performing cryptographic data processing operations in a manner resistant to external monitoring attacks, in accordance with one or more aspects of the present disclosure.

FIG. 7 depicts a flow diagram of an example method 700 for performing cryptographic data processing operations in a manner resistant to external monitoring attacks in accordance with one or more aspects of the present disclosure. Method 700 and/or each of its individual functions, routines, subroutines, or operations may be performed by one or more general purpose and/or specialized processing devices. Two or more functions, routines, subroutines, or operations of method 700 may be performed in parallel or in an order that may differ from the order described above. In certain implementations, method 700 may be performed by a single processing thread. Alternatively, method 700 may be performed by two or more processing threads, each thread executing one or more individual functions, routines, subroutines, or operations of the method. In an illustrative example, the processing threads implementing method 700 may be synchronized (e.g., using semaphores, critical sections, and/or other thread synchronization mechanisms). Alternatively, the processing threads implementing method 700 may be executed asynchronously with respect to each other. In an illustrative example, method 700 may be performed by computing system 1000 described herein below with references to FIG. 11.

Referring to FIG. 7, at block 710, a processing device implementing the method may execute a first data manipulation instruction of an enhanced cryptographic instruction set (e.g., AES-NI instructions). In an illustrative example, the first data manipulation instruction may utilize one or more input data items, e.g., an AES round state and an AES round key. As noted herein above, the first data manipulation instruction may utilize and affect an internal state (e.g., an internal register of the processing device) that may be interacted with or utilized by subsequent data manipulation instructions.

At block 720, the processing device may execute a second data manipulation instruction of the enhanced cryptographic instruction set. The second data manipulation instruction may utilize one or more input data items, e.g., an AES round state modified by the first data manipulation instruction and an AES round key. The second data manipulation instruction may further interact with or utilize the internal state that was modified by the preceding data manipulation instruction, thus potentially creating a DPA-detectable data leakage, as described in more details herein above.

To break the DPA-detectable interaction of the first data manipulation instruction and the second data manipulation instruction, the processing device may, at block 730, execute a third data manipulation instruction utilizing an unpredictable input data item. As noted herein above, the third data manipulation instruction may be executed serially or concurrently with respect to the first and the second data manipulation instructions. Breaking the undesirable interaction of the sequential cryptographic data processing instructions allows the processing device to perform the instructions in a manner resistant to external monitoring attacks, as described in more details herein above.

Figure 8:
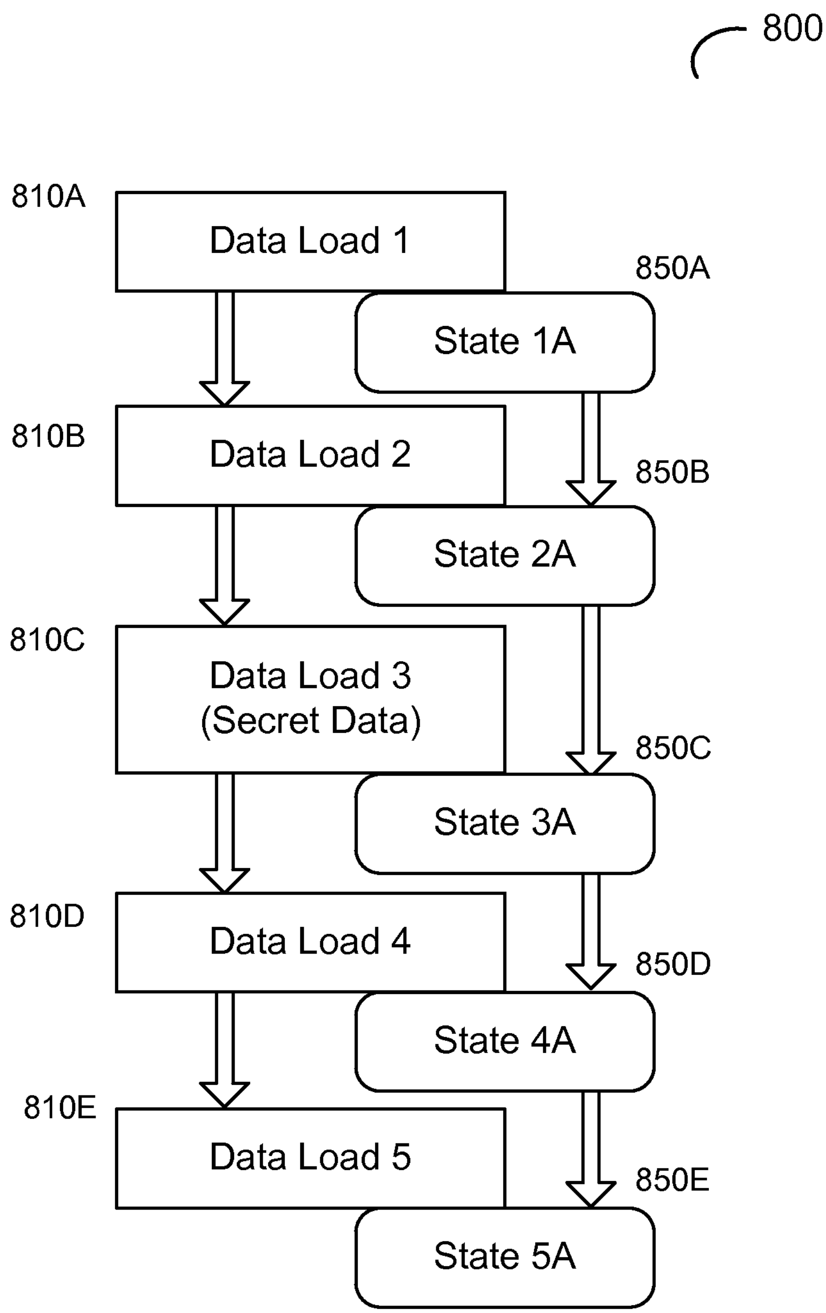
FIG. 8 schematically illustrates a data leak involving sequential data load instructions executed by a target data processing system.

In certain implementations, a data processing system may exhibit a data leak involving sequential data loads from a memory (e.g., from a processor cache), as schematically illustrated by FIG. 8. In an illustrative example, a data processing system may execute a sequence 800 of data load instructions 810A-810E. The sequence may comprise a data load instruction 810C to load, from a memory, one or more secret data items (e.g., AES round keys). In an illustrative example, the sequence 800 of data load instructions may comprise data load instructions 810A-810B preceding the data load instruction 810C that loads the secret data. The sequence 800 of data load instructions may further comprise data load instructions 810D-810E following the data load instruction 810C that loads the secret data. The order of operations 810A-810E shown in FIG. 8 refers to the order of fetching the corresponding instructions by the pipeline implemented by the example data processing system; the order in which the instructions are executed by various units of the example data processing system does not necessarily match the order in which the instructions have been fetched.

In certain implementations, executing each of the data load instructions 810A, 810C, and 810E, may result in the corresponding internal states 850A, 850C, and 850E. The data processing system may exhibit a DPA-detectable data leakage involving the state 850C corresponding to the data load instruction 810C loading the secret data and each of the states 850A and 850B corresponding to the data load instruction 810A-810B that may be employed to load known varying data: the observed power consumed by certain circuits of the data processing system when executing the data load instructions resulting in overwriting a state bit may exceed the observed power consumed by the data processing system when executing the same data load instructions resulting in preserving the existing value of the state bit. Thus, the data processing system may exhibit a DPA-detectable interaction between the data load instruction 810C and data load instructions 810A, 810E which are executed prior to or subsequent to the data load instruction 810C. If the data load instructions 810A and/or 810E load varying data that is known to a potential attacker, the attacker may exploit the interaction of the secret data being loaded by the data load instruction 810C and the variable input data being loaded by the data load instructions 810A and/or 810E.

Figure 9:
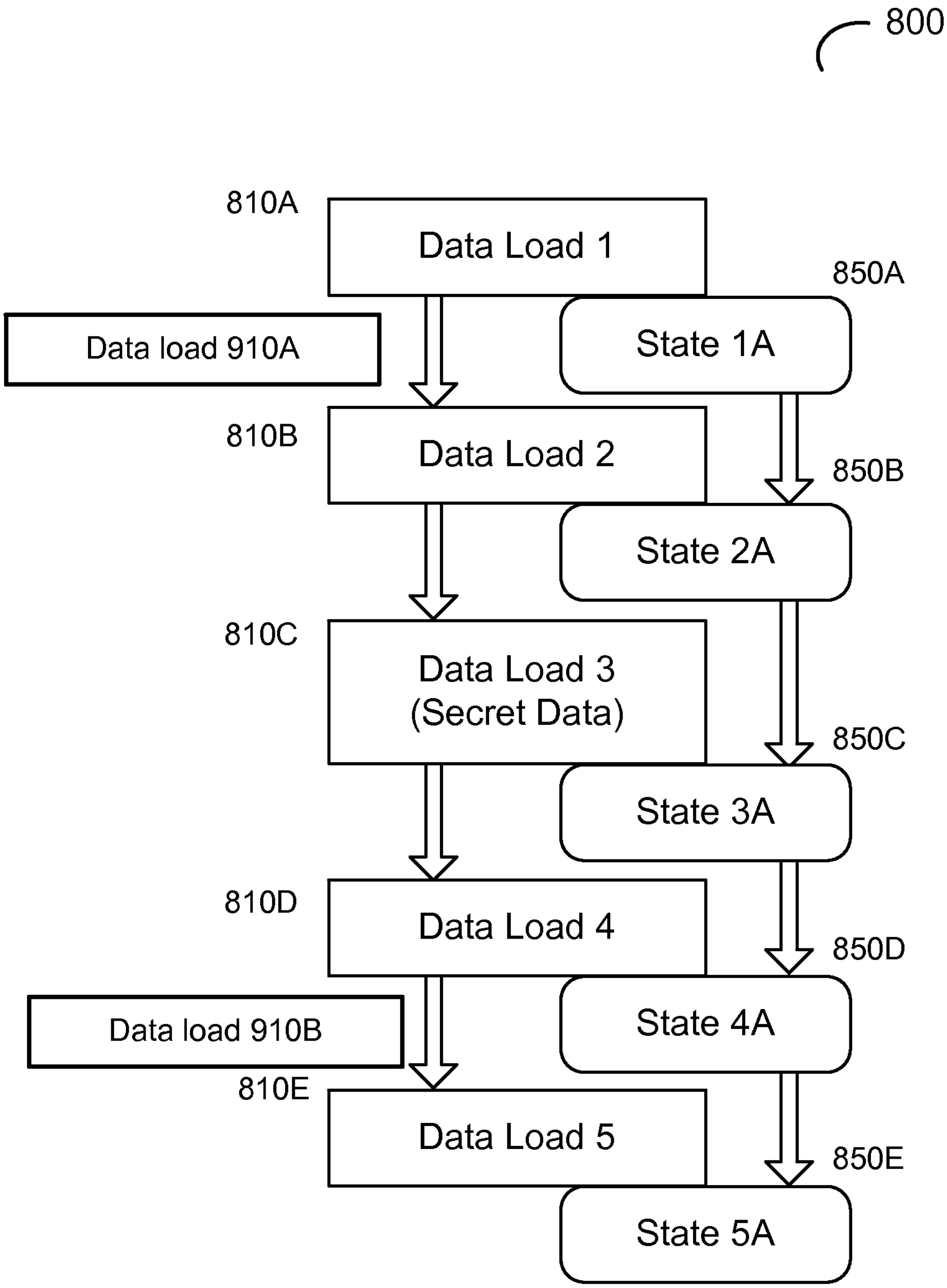
FIG. 9 schematically illustrates breaking the interaction of sequential data load instructions by executing additional data load instructions by the data processing system, in accordance with one or more aspects of the present disclosure.

In accordance with one or more aspects of the present disclosure, the sequence of data load instructions may be performed in a manner resistant to external monitoring attacks exploiting the above described vulnerability of the data processing system, by breaking the interaction of the sequential data load instructions which are likely to exhibit the above described data leakage. In an illustrative example, the data processing system may break the interaction of the sequential cryptographic data processing instructions by executing two data load instructions before and after the data load instruction that loads secret data, as schematically illustrated by FIG. 9.

In order to perform the cryptographic data processing instructions in a manner resistant to external monitoring attacks, the data processing system may break the interaction of the sequential cryptographic data processing instructions by adding, to the sequence of instructions 800, two data load instruction 910A-910B. The data load instruction 910A may be executed one data load instruction before the data load instruction 810C that loads the secret data. The data load instruction 910B may be executed one data load instruction after the data load instruction 810C that loads the secret data, as schematically illustrated by FIG. 9. The order of instructions shown in FIG. 9 refers to the order of fetching the corresponding instructions by the pipeline implemented by the example data processing system; the order in which the instructions are executed by various units of the example data processing system does not necessarily match the order in which the instructions have been fetched.

In order to break the interaction of the sequential cryptographic data processing instructions, the data load instructions 910A-910B may be executed with the inputs represented by constant and/or secret data, in order to prevent a potential attacker from exploiting any data leakage associated with the internal state transitions: as external monitoring attacks exploiting vulnerabilities associated with internal system states involve measuring the system response to the varying input data, such an attack could not be implemented when the input data is constant and/or secret.

Thus, executing data load instructions 910A-910B before and after the data load instruction 810C that loads the secret data, may effectively break the undesirable interaction of the sequential cryptographic data processing instructions and hence perform the instructions in a manner resistant to external monitoring attacks. In certain implementations, further efficiency may be possible by obtaining the data load instructions 910A-910B by rearranging, moving, or replacing instructions in the existing instruction sequence instead of introducing extra instructions.

Figure 10:
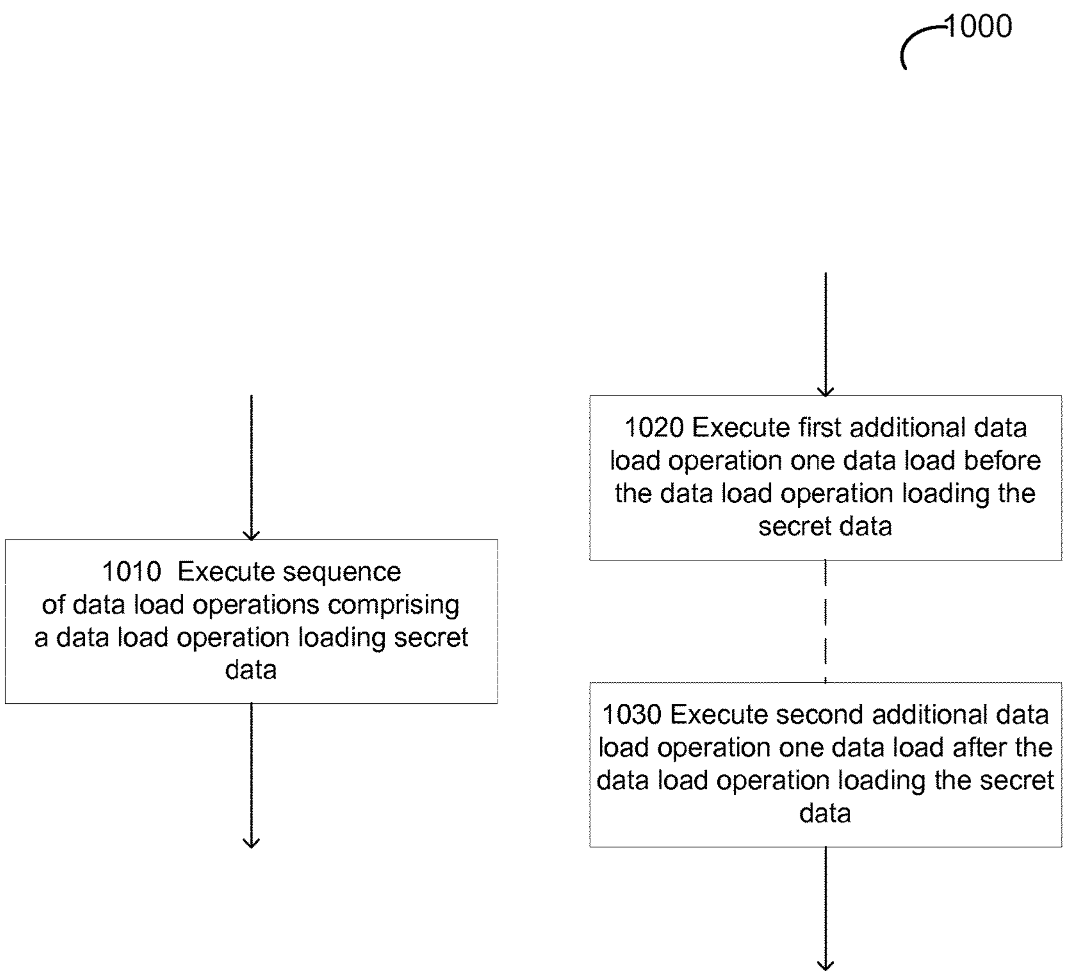
FIG. 10 depicts a flow diagram of another example method for performing cryptographic data processing operations in a manner resistant to external monitoring attacks, in accordance with one or more aspects of the present disclosure.

FIG. 10 depicts a flow diagram of an example method 1000 for performing cryptographic data processing operations in a manner resistant to external monitoring attacks in accordance with one or more aspects of the present disclosure. Method 1000 and/or each of its individual functions, routines, subroutines, or operations may be performed by one or more general purpose and/or specialized processing devices. Two or more functions, routines, subroutines, or operations of method 1000 may be performed in parallel or in an order that may differ from the order described above. In certain implementations, method 1000 may be performed by a single processing thread. Alternatively, method 1000 may be performed by two or more processing threads, each thread executing one or more individual functions, routines, subroutines, or operations of the method. In an illustrative example, the processing threads implementing method 1000 may be synchronized (e.g., using semaphores, critical sections, and/or other thread synchronization mechanisms). Alternatively, the processing threads implementing method 1000 may be executed asynchronously with respect to each other. In an illustrative example, method 1000 may be performed by computing system 1000 described herein below with references to FIG. 11.

Referring to FIG. 10, at block 1010, a processing device implementing the method may execute a sequence of data load instructions. In an illustrative example, at least one data load instruction of the sequence may load secret data (e.g., encryption key). As noted herein above, the data load instructions may utilize and modify an internal state of the processing device, thus creating a DPA-detectable interaction between certain data load instructions. In an illustrative example, the data processing system may exhibit an undesirable interaction between a given data load instruction and a data load instruction that is executed one data load instruction before and/or after the given data load instruction, as described in more details herein above.

At block 1020 the processing device may execute, within the sequence of data load instructions, a first additional data load instruction to load a first secret or constant data item. "Additional instruction" herein may refer to an instruction inserted into the sequence of data load instructions by rearranging the application flow of instructions or by inserting a new instruction into the sequence of data load instructions. In an illustrative example, the first additional data load instruction may be executed one data load instruction before the data load instruction that loads the secret data, as described in more details herein above.

At block 1030 the processing device may execute, within the sequence of data load instructions, a second additional data load instruction to load a second secret or constant data item. In an illustrative example, the second additional data load instruction may be executed one data load instruction after the data load instruction that loads the secret data, as described in more details herein above.

By executing the two data load instructions that "bracket" the data load instruction that loads the secret data, the data processing system may effectively break the undesirable interaction of the sequential data load instructions, and hence perform the instructions in a manner resistant to external monitoring attacks.

Figure 11:
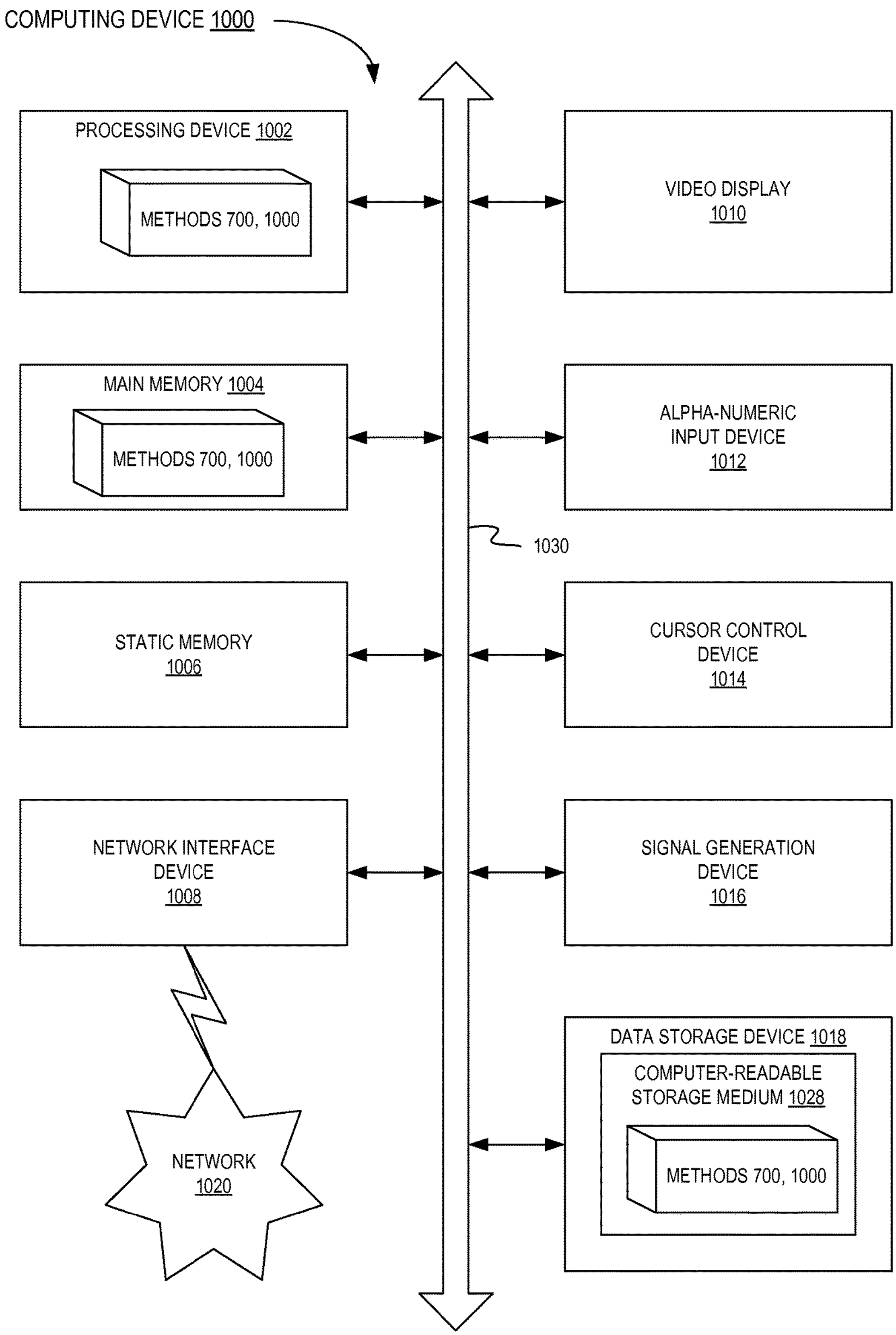
FIG. 11 illustrates a diagrammatic representation of an example computing system within which a set of instructions, for causing the computing device to perform the methods described herein, may be executed.

FIG. 11 illustrates a diagrammatic representation of a computing system 1000 which may incorporate the processing device described herein and within which a set of instructions, for causing the computing device to perform the methods described herein, may be executed. Computing system 1000 may be connected to other computing devices in a LAN, an intranet, an extranet, and/or the Internet. The computing device may operate in the capacity of a server machine in a client-server network environment. The computing device may be provided by a personal computer (PC), a set-top box (STB), a server, a network router, switch or bridge, or any machine capable of executing a set of instructions (sequential or otherwise) that specify actions to be taken by that machine. Further, while only a single computing device is illustrated, the term "computing device" shall also be taken to include any collection of computing devices that individually or jointly execute a set (or multiple sets) of instructions to perform the methods described herein.

The example computing system 1000 may include a processing device 1002, which in various illustrative examples may be a general purpose or specialized processor comprising one or more processing cores. The example computing system 1000 may further comprise a main memory 1004 (e.g., synchronous dynamic random access memory (DRAM), read-only memory (ROM)), a static memory 1006 (e.g., flash memory and a data storage device 1018), which may communicate with each other via a bus 1030.

The processing device 1002 may be configured to execute methods 700 and/or 1000 for performing cryptographic data processing operations in a manner resistant to external monitoring attacks, in accordance with one or more aspects of the present disclosure for performing the operations and steps described herein.

The example computing system 1000 may further include a network interface device 1008 which may communicate with a network 1020. The example computing system 1000 also may include a video display unit 1010 (e.g., a liquid crystal display (LCD) or a cathode ray tube (CRT)), an alphanumeric input device 1012 (e.g., a keyboard), a cursor control device 1014 (e.g., a mouse) and an acoustic signal generation device 1016 (e.g., a speaker). In one embodiment, the video display unit 1010, the alphanumeric input device 1012, and the cursor control device 1014 may be combined into a single component or device (e.g., an LCD touch screen).

The data storage device 1018 may include a computer-readable storage medium 1028 on which may be stored one or more sets of instructions (e.g., instructions of methods 700 and/or 1000 for performing cryptographic data processing operations in a manner resistant to external monitoring attacks, in accordance with one or more aspects of the present disclosure) implementing any one or more of the methods or functions described herein. Instructions implementing methods 700 and/or 1000 may also reside, completely or at least partially, within the main memory 1004 and/or within the processing device 1002 during execution thereof by the example computing system 1000, hence the main memory 1004 and the processing device 1002 may also constitute or comprise computer-readable media. The instructions may further be transmitted or received over the network 1020 via the network interface device 1008.

While the computer-readable storage medium 1028 is shown in an illustrative example to be a single medium, the term "computer-readable storage medium" should be taken to include a single medium or multiple media (e.g., a centralized or distributed database and/or associated caches and servers) that store the one or more sets of instructions. The term "computer-readable storage medium" shall also be taken to include any medium that is capable of storing, encoding or carrying a set of instructions for execution by the machine and that cause the machine to perform the methods described herein. The term "computer-readable storage medium" shall accordingly be taken to include, but not be limited to, solid-state memories, optical media and magnetic media.

Unless specifically stated otherwise, terms such as "updating", "identifying", "determining", "sending", "assigning", or the like, refer to actions and processes performed or implemented by computing devices that manipulates and transforms data represented as physical (electronic) quantities within the computing device's registers and memories into other data similarly represented as physical quantities within the computing device memories or registers or other such information storage, transmission or display devices. Also, the terms "first," "second," "third," "fourth," etc. as used herein are meant as labels to distinguish among different elements and may not necessarily have an ordinal meaning according to their numerical designation.

Examples described herein also relate to an apparatus for performing the methods described herein. This apparatus may be specially constructed for the required purposes, or it may comprise a general purpose computing device selectively programmed by a computer program stored in the computing device. Such a computer program may be stored in a computer-readable non-transitory storage medium.

The methods and illustrative examples described herein are not inherently related to any particular computer or other apparatus. Various general purpose systems may be used in accordance with the teachings described herein, or it may prove convenient to construct more specialized apparatus to perform the required method steps. The required structure for a variety of these systems will appear as set forth in the description above.

The above description is intended to be illustrative, and not restrictive. Although the present disclosure has been described with references to specific illustrative examples, it will be recognized that the present disclosure is not limited to the examples described. The scope of the disclosure should be determined with reference to the following claims, along with the full scope of equivalents to which the claims are entitled.

What is claimed is:

1. A method of executing a cryptographic operation, comprising:

executing, by a processing device, a first data manipulation instruction, the first data manipulation instruction modifying an architecturally-invisible register of the processing device, wherein modifying the architecturally-invisible register affects electric current flows in the processing device;

executing a second data manipulation instruction, the second data manipulation instruction interacting with the architecturally-invisible register; and protecting the processing device from a differential power analysis (DPA) attack by breaking a DPA-detectable interaction of the first data manipulation instruction and the second data manipulation instruction by executing a third data manipulation instruction with an input comprising an unpredictable data item, wherein the third data manipulation instruction produces a random value of the architecturally-invisible register.

2. The method of claim 1, wherein the third data manipulation instruction is executed serially with respect to at least one of: the first data manipulation instruction or the second data manipulation instruction.

3. The method of claim 1, wherein the third data manipulation instruction is executed concurrently with respect to at least one of: the first data manipulation instruction or the second data manipulation instruction.

4. The method of claim 1, wherein at least one of the first data manipulation instruction or the second data manipulation instruction belongs to an enhanced instruction set for performing cryptographic data processing operations.

5. The method of claim 4, wherein the enhanced instruction set is provided by one of: an Intel AES-NI instruction set, an ARM Advanced Encryption Standard (AES) instruction set, or a SPARC AES instruction set.

6. The method of claim 1, wherein the processing device is provided by one of: an Intel microprocessor, an ARM microprocessor, or a SPARC microprocessor.

7. The method of claim 1, wherein an application comprising at least one of the first data manipulation instruction or the second data manipulation instruction is configured to implement at least one of an encryption method based on the Advanced Encryption Standard (AES) or a decryption method based on the Advanced Encryption Standard (AES).

8. The method of claim 1, wherein the second data manipulation instruction utilizes an input data item provided by an output of the first data manipulation instruction.

9. The method of claim 1, wherein at least one of the first data manipulation instruction and the second data manipulation instruction utilizes an input data item comprising a cryptographic key.

10. The method of claim 1, wherein at least one of the first data manipulation instruction and the second data manipulation instruction performs one of: an AES encryption round or an AES decryption round.

11. A method, comprising:

executing, by a processing device, a sequence of data load instructions modifying an architecturally-invisible register of the processing device, wherein modifying the architecturally-invisible register affects electric current flows in the processing device, and wherein a certain data load instruction of the sequence loads secret data; and protecting the processing device from a differential power analysis (DPA) attack by breaking a DPA-detectable interaction of two or more data load instructions of the sequence by executing, within the sequence, a first data load instruction to load a first data item and a second data load instruction to load a second data item, wherein the first data item is provided by one of: a first secret data item or a first constant data item, and wherein the second data item is provided by one of: a second secret data item or a second constant data item, wherein the third data manipulation instruction produces a random value of the architecturally-invisible register.

12. The method of claim 11, wherein the memory is provided by a cache of the processing device.

13. The method of claim 11, wherein executing the first data load instruction is performed one data load instruction before the certain data load instruction that loads the secret data.

14. The method of claim 13, wherein executing the second data load instruction is performed one data load instruction after the certain data load instruction that loads the secret data.

15. A computer-readable non-transitory storage medium comprising executable instructions that, when executed by a computing device, cause the computing device to perform operations, comprising:

executing, by a processing device, a first data manipulation instruction, the first data manipulation instruction modifying an architecturally-invisible register of the processing device, wherein modifying the architecturally-invisible register affects electric current flows within the processing device;

executing a second data manipulation instruction, the second data manipulation instruction interacting with the architecturally-invisible register; and protecting the processing device from a differential power analysis (DPA) attack by breaking a DPA-detectable interaction of the first data manipulation instruction and the second data manipulation instruction by executing a third data manipulation instruction with an input comprising an unpredictable data item, wherein the third data manipulation instruction produces a random value of the architecturally-invisible register.

16. The computer-readable non-transitory storage medium of claim 15, wherein the third data manipulation instruction is executed serially with respect to at least one of: the first data manipulation instruction or the second data manipulation instruction.

17. The computer-readable non-transitory storage medium of claim 15, wherein the third data manipulation instruction is executed concurrently with respect to at least one of: the first data manipulation instruction or the second data manipulation instruction.

* * * * *